US012613601B2

(12) United States Patent
Xu et al.

(10) Patent No.: US 12,613,601 B2
(45) Date of Patent: Apr. 28, 2026

(54) TOUCH DETECTION METHOD AND APPARATUS, ELECTRONIC DEVICE, AND READABLE STORAGE MEDIUM

(71) Applicant: SHENZHEN HITEVISION TECHNOLOGY CO., LTD., Shenzhen (CN)

(72) Inventors: Xiezeng Xu, Shenzhen (CN); Shuai Wang, Shenzhen (CN); Minghua Zhang, Shenzhen (CN)

(73) Assignee: SHENZHEN HITEVISION TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 18/978,000

(22) Filed: Dec. 12, 2024

(65) Prior Publication Data

US 2025/0110598 A1 Apr. 3, 2025

Related U.S. Application Data

(63) Continuation of application No. PCT/CN2023/093214, filed on May 10, 2023.

(30) Foreign Application Priority Data

Dec. 19, 2022 (CN) .......................... 202211631452.0

(51) Int. Cl.
*G06F 3/044* (2006.01)
*G06F 3/041* (2006.01)
(52) U.S. Cl.
CPC .......... *G06F 3/0446* (2019.05); *G06F 3/0418* (2013.01)
(58) Field of Classification Search
CPC ................................. G06F 3/041; G06F 3/044
(Continued)

(56) References Cited

U.S. PATENT DOCUMENTS 9,207,822 B1 12/2015 Kremin et al.
2011/0127092 A1 6/2011 Lu
(Continued)

FOREIGN PATENT DOCUMENTS

CN 108762557 A 11/2018
CN 108762653 A 11/2018
(Continued)

OTHER PUBLICATIONS

The International search report for PCT Application No. PCT/CN2023/093214, dated Sep. 4, 2023, 5 pages.
(Continued)

*Primary Examiner* — Kwin Xie
(74) *Attorney, Agent, or Firm* — East IP P.C.

(57) ABSTRACT

The present application discloses a touch detection method and apparatus, an electronic device, and a readable storage medium. The touch detection method comprises: determining at least one touch area according to sampled values of capacitive sensing nodes of a touch screen; performing, according to the sampled values of each touch area and position information of each touch area, target restoration processing on the sampled values in the touch area to determine target values of the capacitive sensing nodes in each touch area; determining a peak point of the target values in each touch area according to the target values of the capacitive sensing nodes in each touch area; and determining a valid touch area according to a preset touch threshold and the peak point of the target values in each touch area.

15 Claims, 7 Drawing Sheets

(58) Field of Classification Search
USPC ................................................. 345/173–174
See application file for complete search history.

(56)                     References Cited

U.S. PATENT DOCUMENTS

| | | | |
|---|---|---|---|
| 2012/0188183 A1 | 7/2012 | Heo et al. | |
| 2014/0104194 A1 | 4/2014 | Davidson et al. | |
| 2016/0291737 A1 | 10/2016 | Hirakawa | |
| 2017/0031521 A1 | 2/2017 | Drake | |
| 2017/0277346 A1* | 9/2017 | Jeong | G06F 3/0446 |
| 2020/0371643 A1* | 11/2020 | Kim | G06F 3/0445 |
| 2021/0294479 A1* | 9/2021 | Moscovich | G06F 3/045 |
| 2022/0011892 A1* | 1/2022 | Rosenberg | G06F 3/0447 |

FOREIGN PATENT DOCUMENTS

| | | | | | |
|---|---|---|---|---|---|
| CN | 111381729 A | | 7/2020 | | |
| CN | 113204293 A | | 8/2021 | | |
| CN | 115808990 A | | 3/2023 | | |
| GB | 2499282 A | * | 8/2013 | | G06F 3/047 |
| JP | 3537096 B2 | * | 6/2004 | | G06F 3/045 |
| TW | 201243383 A | * | 11/2012 | | G06F 3/041 |

OTHER PUBLICATIONS

The extended European search report dated Aug. 4, 2025 for European Application No. 23905128.7, 9 pages.

* cited by examiner

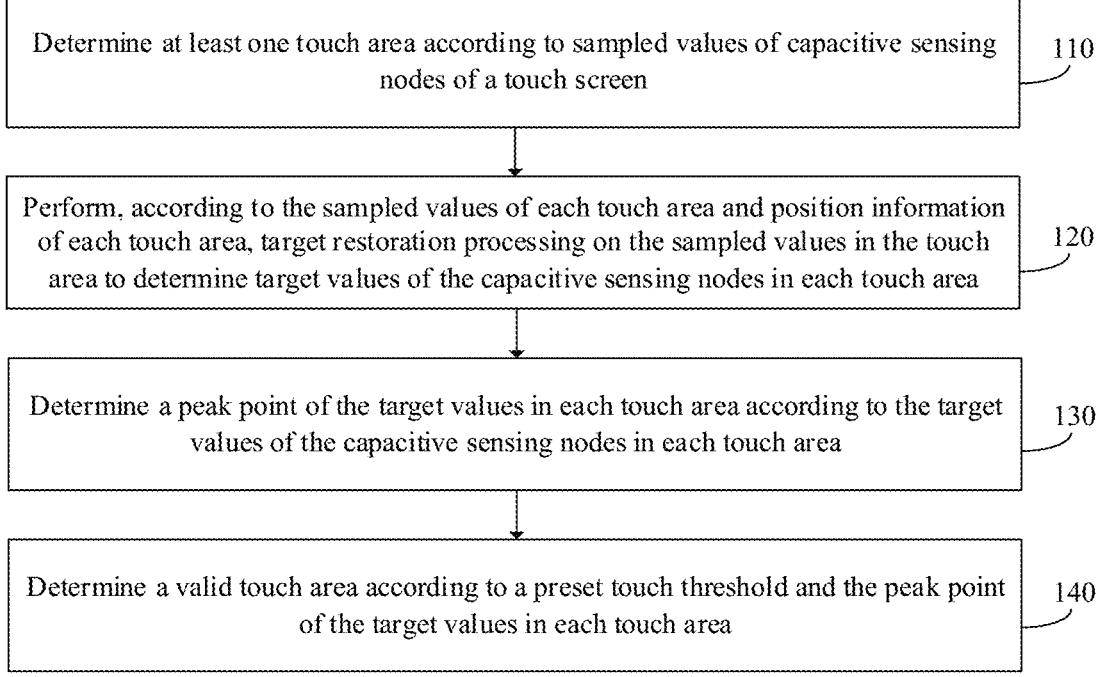

| Determine at least one touch area according to sampled values of capacitive sensing nodes of a touch screen | 110 |

| Perform, according to the sampled values of each touch area and position information of each touch area, target restoration processing on the sampled values in the touch area to determine target values of the capacitive sensing nodes in each touch area | 120 |

| Determine a peak point of the target values in each touch area according to the target values of the capacitive sensing nodes in each touch area | 130 |

| Determine a valid touch area according to a preset touch threshold and the peak point of the target values in each touch area | 140 |

| 128 | 128 | 128 | 128 | 128 | 128 | 128 | 128 | 128 | 128 | 128 | |
| 128 | 128 | 128 | 128 | 128 | 128 | 128 | 128 | 128 | 128 | 128 | |
| 128 | 130 | 128 | 128 | 128 | 128 | 128 | 128 | 128 | 128 | 128 | |
| 128 | 129 | 128 | 128 | 128 | 128 | 128 | 128 | 128 | 128 | 128 | |
| 128 | 129 | 128 | 128 | 128 | 128 | 128 | 128 | 123 | 135 | 128 | |
| 128 | 128 | 128 | 128 | 128 | 128 | 128 | 128 | 128 | 128 | 128 | |
| 128 | 128 | 128 | 128 | 128 | 128 | 128 | 128 | 128 | 128 | 128 | |
| 128 | 128 | 128 | 128 | 128 | 128 | 128 | 128 | 128 | 128 | 128 | |
| 128 | 128 | 128 | 128 | 128 | 128 | 128 | 128 | 128 | 128 | 128 | |
| 128 | 128 | 128 | 128 | 128 | 128 | 128 | 128 | 128 | 128 | 128 | |
| 128 | 128 | 128 | 128 | 128 | 128 | 128 | 128 | 128 | 128 | 128 | |
| 128 | 128 | 128 | 128 | 128 | 128 | 128 | 128 | 128 | 128 | 128 | |
| 128 | 128 | 128 | 128 | 128 | 128 | 128 | 128 | 128 | 128 | 128 | |

Fig. 2

TOUCH DETECTION METHOD AND APPARATUS, ELECTRONIC DEVICE, AND READABLE STORAGE MEDIUM

CROSS REFERENCE TO RELATED APPLICATION

The present application is a continuation application of International Application No. PCT/CN2023/093214 filed on May 10, 2023, which claims priority to Chinese Patent Application No. 202211631452.0 filed on Dec. 19, 2022, both of which are incorporated herein by reference in their entireties.

TECHNICAL FIELD

The present application belongs to the field of touch technology, and in particular, relates to a touch detection method and apparatus, an electronic device, and a readable storage medium.

BACKGROUND

As an important component of human-computer interaction, touch screens have been widely used in electronic products such as mobile phones and interactive tablets. Common touch screens, such as capacitive touch screens, detect changes in capacitance through a plurality of capacitive sensing nodes. When touched, the capacitance value of the capacitive sensing node at the corresponding position changes to generate a corresponding touch event.

SUMMARY

In a first aspect, embodiments of the present application provide a touch detection method, including:

determining at least one touch area according to sampled values of capacitive sensing nodes of a touch screen;

performing, according to the sampled values of each touch area and position information of each touch area, target restoration processing on the sampled values in the touch area to determine target values of the capacitive sensing nodes in each touch area;

determining a peak point of the target values in each touch area according to the target values of the capacitive sensing nodes in each touch area; and determining a valid touch area according to a preset touch threshold and the peak point of the target values in each touch area.

In a second aspect, embodiments of the present application provide a touch detection apparatus, including:

a processing module, configured to determine at least one touch area according to sampled values of capacitive sensing nodes of a touch screen; and a determination module, configured to perform, according to the sampled values of each touch area and position information of each touch area, target restoration processing on the sampled values in the touch area to determine target values of the capacitive sensing nodes in each touch area;

where the determination module is further configured to determine a peak point of the target values in each touch area according to the target values of the capacitive sensing nodes in each touch area;

where the determination module is further configured to determine a valid touch area according to a preset touch threshold and the peak point of the target values in each touch area.

In a third aspect, the present application provides an electronic device, including: a processor, and a memory storing computer program instructions, where when the processor executes the computer program instructions, the touch detection method in the first aspect or any feasible implementation of the first aspect is implemented.

In a fourth aspect, the present application provides a computer-readable storage medium storing computer program instructions that, when executed by a processor, implement the touch detection method in the first aspect or any feasible implementation of the first aspect.

In a fifth aspect, the embodiments of the present application provide a computer program product, where instructions in the computer program product, when executed by a processor of an electronic device, enable the electronic device to perform the touch detection method in the first aspect or any feasible implementation of the first aspect.

BRIEF DESCRIPTION OF THE DRAWINGS

In order to explain the technical solutions of the embodiments of the present application more clearly, the accompanying drawings required in the embodiments of the present application will be briefly introduced below. A person of ordinary skill in the art can obtain other drawings based on these drawings without creative work.

FIG. 1 is a flowchart of a touch detection method provided in an embodiment of the present application;

FIG. 2 is a schematic view of a touch area provided in an embodiment of the present application;

DETAILED DESCRIPTION

Figure 3:
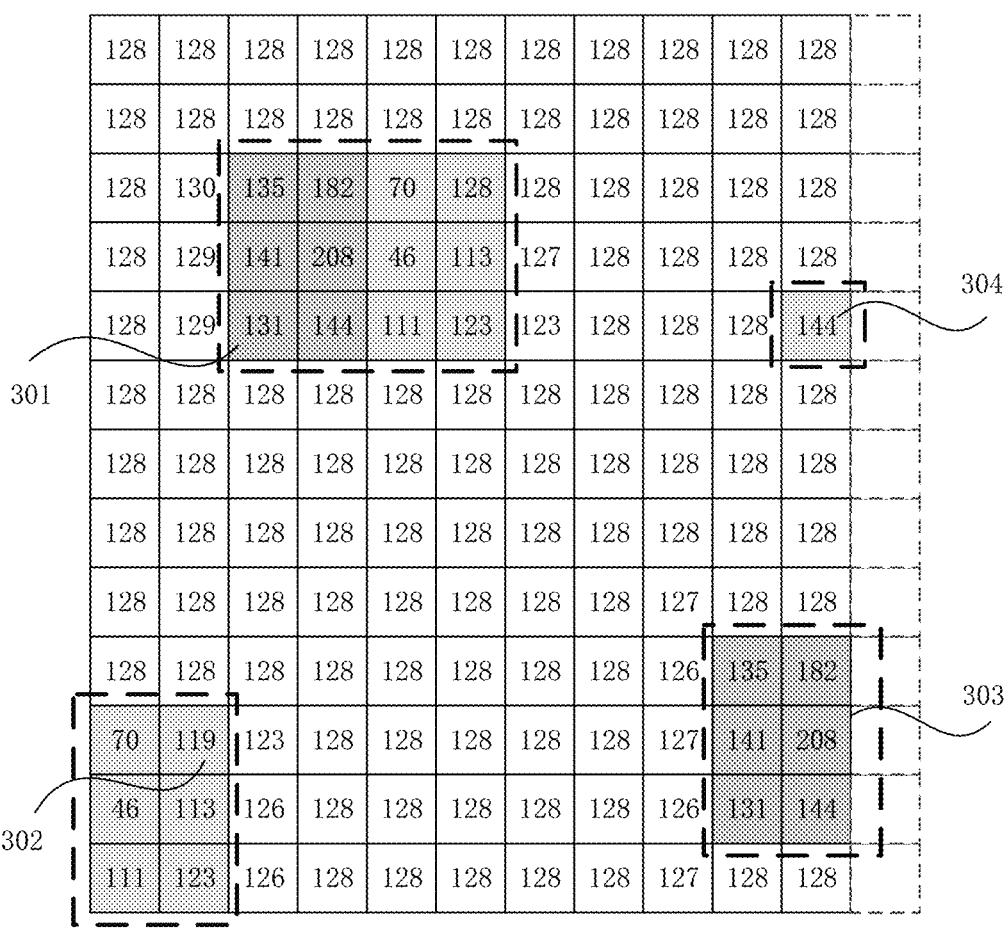
FIG. 3 is a schematic view of another touch area provided in an embodiment of the present application.

Features and exemplary embodiments of various aspects of the present application will be described in detail below. In order to make the objectives, technical solutions, and advantages of the present application clearer, the present application will be further described in detail below with reference to the accompanying drawings and specific embodiments. It should be understood that the specific embodiments described here are only intended to explain the present application, but not to limit the present application. For those skilled in the art, the present application can be implemented without some of these specific details. The following descriptions of the embodiments are merely to provide a better understanding of the present invention by showing examples of the present invention.

It should be noted that the relational terms herein, such as first and second, are merely used for distinguishing one entity or operation from another, and do not necessarily require or imply that any actual relationship or sequence exists between these entities or operations. Moreover, the terms "include", "comprise", and any variants thereof are intended to cover a non-exclusive inclusion, so that a process, method, article, or device including a series of elements not only includes those elements, but also includes other elements not listed explicitly, or includes inherent elements of the process, method, article, or device. In the absence of more limitations, an element defined by "include a . . . " does not exclude other same elements existing in the process, method, article, or device including the element.

As an important component of human-computer interaction, touch screens have been widely used in electronic products such as mobile phones and interactive tablets. Common touch screens, such as capacitive touch screens, detect changes in capacitance through a plurality of capacitive sensing nodes. When touched, the capacitance value of the capacitive sensing node at the corresponding position changes to generate a corresponding touch event.

At present, when a touch operation is detected, sampled signals corresponding to capacitive sensing nodes are weak and will be directly discarded, resulting in inaccurate determination on the type of a touch area.

In view of this, the embodiments of the present application provide a touch detection method and apparatus and an electronic device, which can improve the accuracy of determining the type of a touch area.

Hereinafter, the touch detection method provided in embodiments of the present application will be introduced in conjunction with the accompanying drawings. FIG. 1 illustrates a flowchart of a touch detection method provided in an embodiment of the present application. As shown in FIG. 1, the method may include steps 110 to 140.

Step 110: Determine at least one touch area according to sampled values of capacitive sensing nodes of a touch screen.

Step 120: Perform, according to the sampled values of each touch area and position information of each touch area, target restoration processing on the sampled values in the touch area to determine target values of the capacitive sensing nodes in each touch area.

Step 130: Determine a peak point of the target values in each touch area according to the target values of the capacitive sensing nodes in each touch area.

Step 140: Determine a valid touch area according to a preset touch threshold and the peak point of the target values in each touch area.

Specifically, the touch screen may be a capacitive touch device and corresponds to a plurality of capacitive elements, each of which may serve as a capacitive sensing node. Under a condition that the touch screen receives a touch input, the capacitance of the capacitive element corresponding to the capacitive sensing node that receives the touch input changes. Taking a differential signal capacitive touch device as an example, the difference between the target value of the previous capacitive sensing node and the target value of the subsequent capacitive sensing node on the same channel is added to a reference value as the sampled value of the previous capacitive sensing node. Only by knowing the sampled value of the previous or subsequent capacitive sensing node, the sampled value of another capacitive sensing node can be obtained according to the difference.

For example, FIG. 2 is a schematic view of a touch area provided in an embodiment of the present application. For example, the touch screen includes M+1 columns of capacitive sensing nodes, and the capacitive elements of the touch screen include the $(M+1)^{th}$ column of capacitive sensing nodes 201 as shown in FIG. 2, where the $(M+1)^{th}$ column of capacitive sensing nodes is in the last channel. In the absence of a channel for difference calculation from the last column of receiving channel, signals in the last column of channel are prone to inaccuracy. Therefore, the sampled values in the last column of channel can be filtered out, and the sampled values of the capacitive sensing nodes in the first to $M^{th}$ columns are retained. Optionally, the preset reference capacitance may be 128. Under a condition that the touch screen does not receive any touch input, the sampled values of the capacitive sensing nodes of the touch screen may be as shown in FIG. 2. The sampled value of each capacitive sensing node is 128.

Under a condition that the touch screen receives a touch input, an area receiving the touch input can be determined according to the sampled values of the capacitive sensing nodes. For example, under a condition that the touch screen receives touch, the sampled values of the capacitive sensing nodes may change. For example, the sampled values of the capacitive sensing nodes increase or decrease. Specifically, the area where the sampled values of the capacitive sensing nodes change can be used as an area for determining whether it is a valid touch area. Optionally, the difference between the sampled value and the reference value is a variation of a capacitive sensing node. Under a condition that the variation of a capacitive sensing node is less than a threshold, the capacitive sensing node can be ignored and designated as a non-touch area, which is not specifically limited here.

For ease of calculation, the area where the capacitive sensing nodes change can be divided by a rectangle or square. For example, after the sampled values of the capacitive sensing nodes shown in FIG. 2 change, touch areas 301, 302, 303, and 304 shown in FIG. 3 can be obtained.

Exemplary types of the touch areas include invalid touch areas and valid touch areas. The invalid touch area refers to, for example, unintended touch on the touch screen by user's clothing. The valid touch area refers to, for example, click input or sliding input on the touch screen by a user's finger or an electronic pen.

In some embodiments, the sampled values include positive-pole sampled values, negative-pole sampled values, etc.

For example, under a condition that a capacitive sensing node is touched, the target value of the capacitive sensing node decreases relative to a preset reference value; under a condition that a plurality of consecutive capacitive sensing nodes are touched, their target values decrease sequentially from left to right; under a condition that a minimum value is reached, their target values increase sequentially from left to right. The target values of the plurality of capacitive sensing nodes may present a U shape. Under a condition that the touch operation is close enough to the left edge of the touch screen, only the rear half of the U shape is presented, that is, only negative-pole sampled values are presented. Under a condition that the touch is close enough to the right edge of the touch screen, only the front half of the U shape is presented, that is, only positive-pole sampled values are presented.

Continuing to take a differential signal capacitive touch device as an example, the difference between the target value of the previous capacitive sensing node and the target value of the subsequent capacitive sensing node in the same row is added to a reference value as the sampled value of the previous capacitive sensing node. For ease of description, under a condition that the sampled value is greater than the preset reference threshold (such as 128), the sampled value is a positive-pole sampled value; and under a condition that the sampled value is less than or equal to the preset reference threshold, the sampled value is a negative-pole sampled value.

The touch area corresponding to the touch point in the middle of the touch screen includes positive-pole sampled values and negative-pole sampled values, such as touch area 301 shown in FIG. 3.

Under a condition that the sampled value of a capacitive sensing node is calculated, the difference between the sampled values of the previous node and the subsequent node is added to the reference value as the sampled value of the previous signal. Specifically, the value of the left node is subtracted from the value of the right node to obtain a signal difference plus the reference value as the sampled value of the left node. Under a condition that a capacitive sensing node receives a touch operation, the sensing value of the capacitive sensing node is greater than the reference value. Therefore, under a condition that the leftmost capacitive sensing node of the touch screen receives the touch operation, the difference obtained by directly subtracting the sampled value of the leftmost capacitive sensing node from the reference value is added to the reference value to obtain a negative signal. So the positive signal of the touch area on the left edge is missing. Starting from the first line, the received signal is the rising signal of the right half of the U-shaped signal, so the sampled data appears only in the negative area, such as touch area 302 shown in FIG. 3.

Under a condition that the touch area corresponding to the touch point is close to the right edge of the touch screen, the touch area corresponding to the touch point includes positive-pole sampled values, such as touch area 303 shown in FIG. 3. For example, under a condition that the touch point is close to the right edge of the touch screen, the touch area corresponding to the touch point may include only positive-pole sampled values. Because no receiving channel for column detection signals is presented for the rightmost capacitive sensing nodes, and the negative-pole sampled values and some positive-pole sampled values on the right are missing, the touch area on the right edge of the touch screen may include only positive-pole sampled values, such as touch area 304 shown in FIG. 3.

In some embodiments, in order to avoid missing the touch area, for the $M^{th}$ column of capacitive sensing nodes, the difference between the sampled value of each capacitive sensing node and the preset reference value can be separately obtained to obtain the difference of each capacitive sensing node in the $M^{th}$ column. A capacitive sensing node having the difference greater than the preset touch threshold in the $M^{th}$ column, and an upper capacitive sensing node and a lower capacitive sensing node adjacent to the capacitive sensing node, can be obtained. For ease of description, the capacitive sensing node having the difference greater than the preset touch threshold is described as a first node, and the upper capacitive sensing node and the lower capacitive sensing node adjacent to the capacitive sensing node are a second node and a third node, respectively. Under a condition that the difference between the sampled value of the second node and the preset reference value is less than the preset touch threshold, and the difference between the sampled value of the third node and the preset reference value is less than the preset touch threshold, the first node is designated as a touch area.

According to the embodiments of the present application, after the touch area is obtained, a target restoration mode for each touch area can be determined according to the sampled value and position information of each touch area, so as to obtain the target value of each capacitive sensing node in the touch area. Next, the peak point of the target values in each touch area is determined according to the target values of the capacitive sensing nodes in each touch area. Whether the touch area is a valid touch area is determined according to the preset touch threshold and the peak point of the target values in each touch area.

As a specific example, under a condition that the touch area includes a plurality of capacitive sensing nodes, and the peak point of the target values in the touch area and the target value of at least one capacitive sensing node adjacent to the peak point are both greater than the preset touch threshold, the type of the touch area is determined as a valid touch area.

In another embodiment, under a condition that the touch area includes one capacitive sensing node and the target value of the capacitive sensing node is greater than the preset touch threshold, the touch area is designated as a to-be-matched area; touch trajectory matching is performed on the to-be-matched area according to a preset touch trajectory matching algorithm; if the to-be-matched area succeeds in the matching, the touch area is determined as a valid touch area.

Optionally, the preset touch trajectory matching algorithm can be preset and is not specifically limited here.

In some embodiments, in order to improve the accuracy of obtaining the target values, the target values of each touch area can be obtained according to the following steps:

Step 210: Extend an edge of each touch area toward a surrounding area by a preset number of layers of capacitive sensing nodes to obtain a first target area corresponding to each touch area.

Step 220: Perform, according to the sampled values of each touch area and the position information of each touch area, target restoration processing on the sampled values in the first target area to obtain a target value of each capacitive sensing node in the first target area.

The first target area includes the touch area, and the first target area includes N columns of capacitive sensing nodes, where N is a positive integer.

Optionally, under a condition that the touch area is extended, if there are capacitive sensing nodes around the touch area, the touch area can be extended; if there are no capacitive sensing nodes around the touch area, the touch area does not need to be extended. The preset number of layers for the extension of capacitive sensing nodes may be 1 layer or a plurality of layers, and is not specially limited here.

In some embodiments, each touch area is extended to obtain a first target area corresponding to each touch area. To avoid affecting the accuracy of calculation, an extension condition may be preset. The preset extension condition is, for example, the first target areas do not overlap with each other. That is, if two first target areas extended from two touch areas separately overlap, the two touch areas are not extended.

Figure 4:
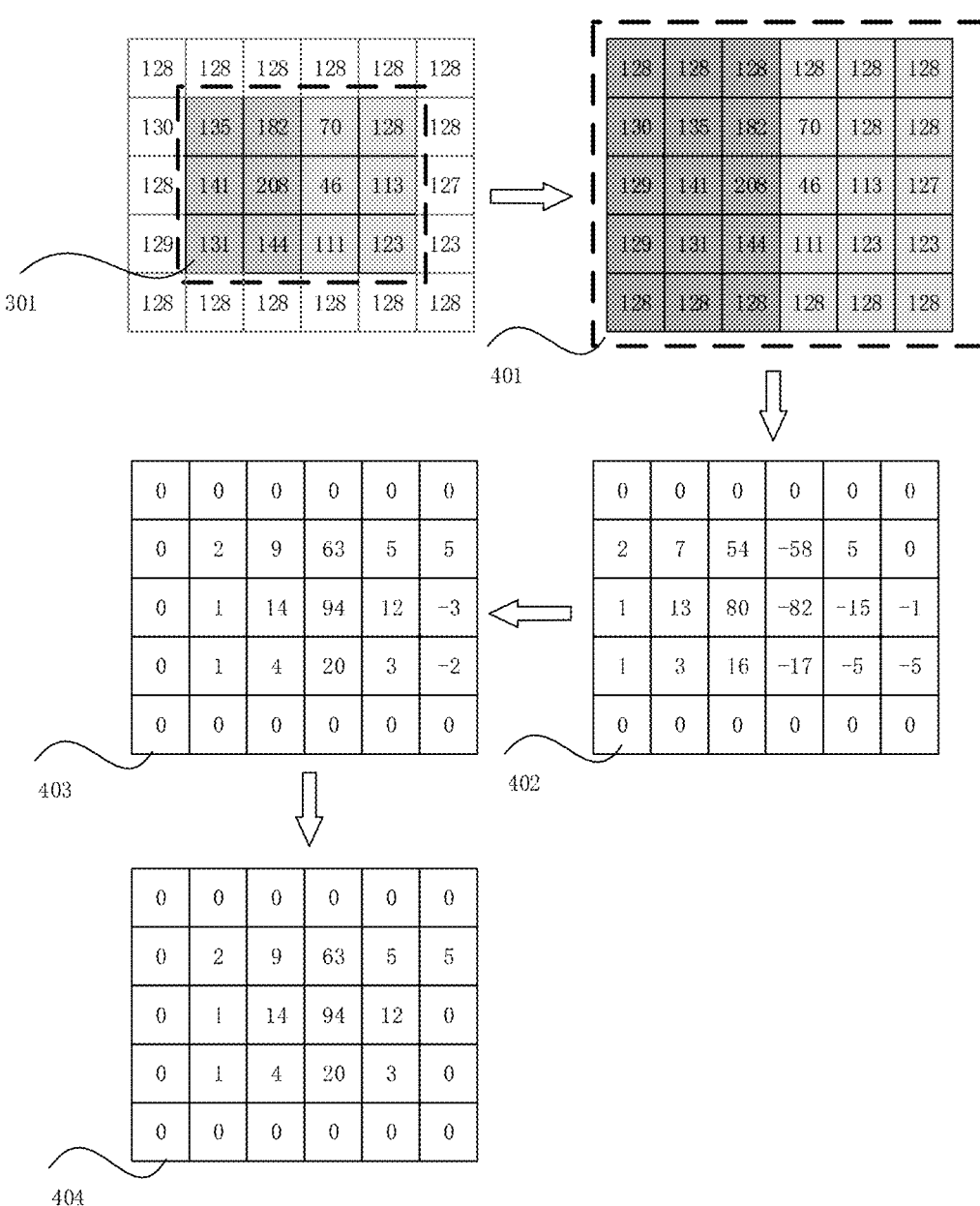
FIG. 4 is a schematic view of another touch area extension provided in an embodiment of the present application.

In one example, as shown in FIG. 3, four sides of the touch area 301 are all non-touch areas, so the four sides of the touch area 301 are adjacent to the capacitive sensing nodes of the non-touch areas. FIG. 4 is a schematic view of another touch area extension provided in an embodiment of the present application. For example, the preset number of layers is 1, and the edge of the touch area 301 is extended toward the surrounding area by 1 layer. As shown in FIG. 4, after the touch area 301 is extended, a first target area 401 is obtained.

For example, the touch screen totally corresponds to M+1 columns of capacitive sensing nodes, where the first column of capacitive sensing nodes corresponds to a first preset edge of the touch screen, namely, a left edge, and the $(M+1)^{th}$ column of capacitive sensing nodes corresponds to a second preset edge of the touch screen, namely, a right edge. The $M^{th}$ column of capacitive sensing nodes is a last column of channel with sampled values.

Figure 5:
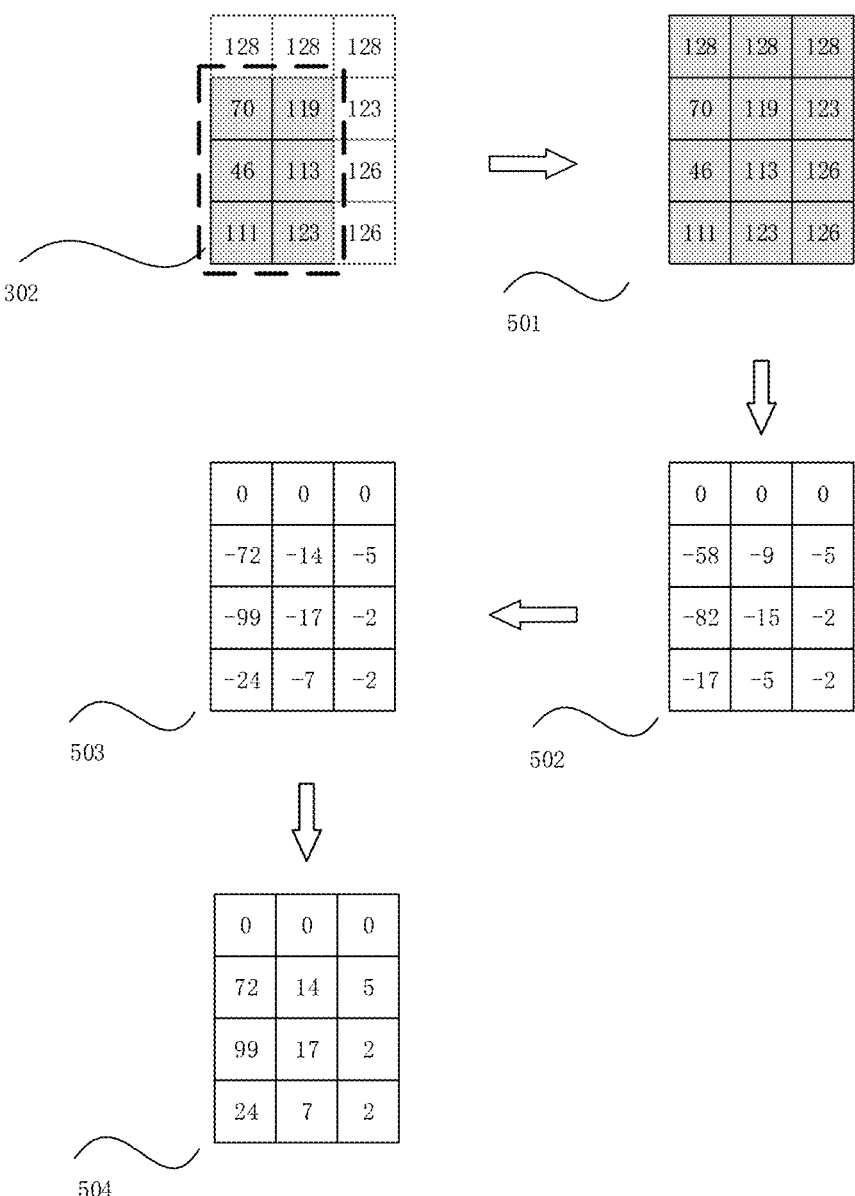
FIG. 5 is a schematic view of an area extension provided in an embodiment of the present application.
Figure 6:
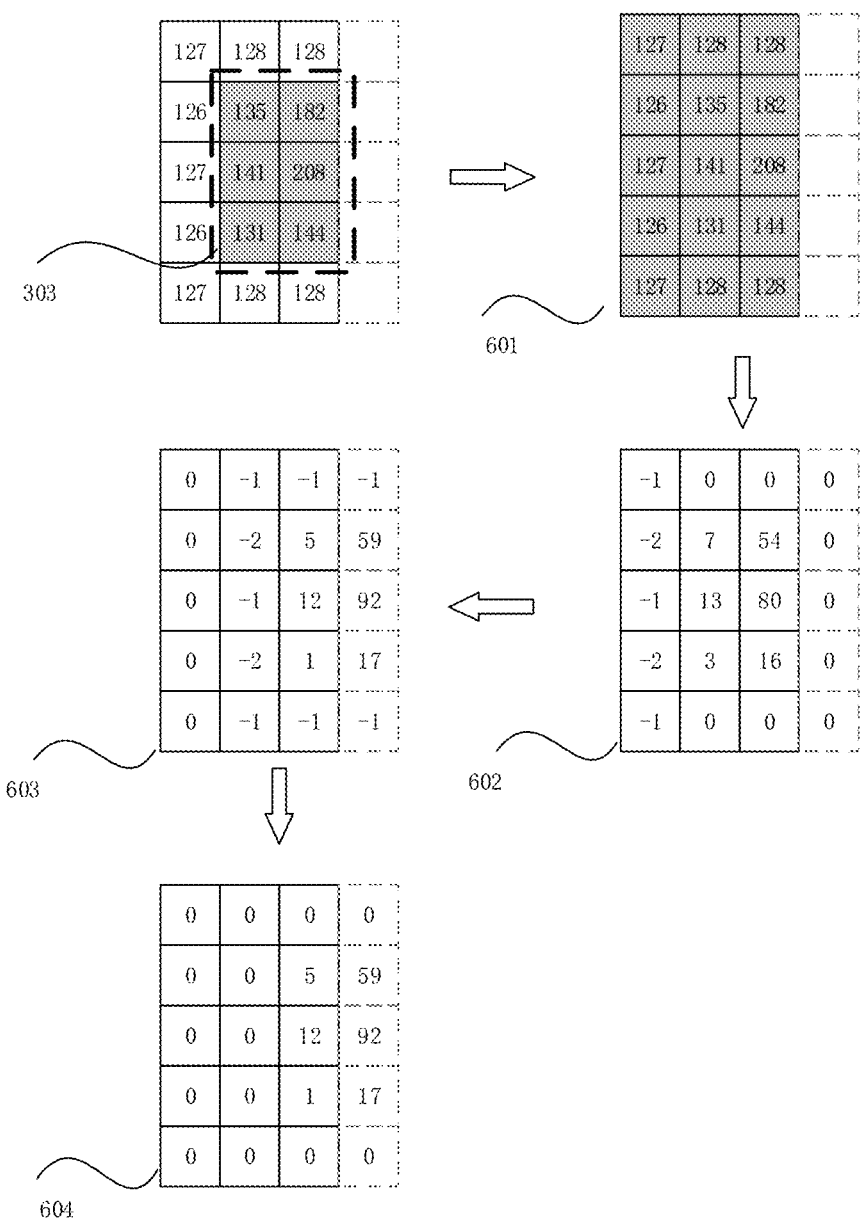
FIG. 6 is a schematic view of another area extension provided in an embodiment of the present application.

In another example, one side edge of the touch area may be the edge of the entire capacitive sensing nodes, such as touch area 302 and touch area 303 shown in FIG. 3. The preset number of layers for extending the edge of the touch area 302 toward the surrounding area may be 1 layer. FIG. 5 is a schematic view of an area extension provided in an embodiment of the present application. As shown in FIG. 5, after the touch area 302 is extended, a first target area 501 is obtained. FIG. 6 is a schematic view of another area extension provided in an embodiment of the present application. As shown in FIG. 6, after the touch area 303 is extended, a first target area 601 is obtained. Understandably, since one side of the touch area is the edge of the entire capacitive sensing nodes, the touch area only needs to be extended towards the side with capacitive sensing nodes.

After the first target area corresponding to the touch area is obtained, a restoration mode required for each first target area can be determined according to the sampled values of each touch area and the position information of each touch area. Then, target restoration processing is performed on the sampled values in the first target area according to the restoration mode required for each first target area to obtain the target value of each capacitive sensing node in the first target area. Since the first target area includes the touch area, a restoration value of each capacitive sensing node in the touch area can be obtained by obtaining a restoration value of each capacitive sensing node in the first target area.

According to the embodiments of the present application, by extending the original touch area by a preset number of layers, edge signals of the original touch area can be incorporated for restoration calculation, thereby avoiding low reliability of target values due to missing edge signals of the original touch area.

In some embodiments, specific reference can be made to the following example for obtaining the target values.

In one example, under a condition that the sampled values of some capacitive sensing nodes in the touch area are greater than the preset reference value, and the sampled values of the other capacitive sensing nodes in the touch area are less than or equal to the preset reference value, the difference between each sampled value in the first target area and the preset reference value is obtained to obtain a first restoration value of each capacitive sensing node; the first restoration values corresponding to the capacitive sensing nodes that are from the $1^{st}$ capacitive sensing node to the $(i-1)^{th}$ capacitive sensing node in each row in the first target area are added together to obtain a second restoration value of the $i^{th}$ capacitive sensing node in each row in the first target area, where $2 \leq i \leq N$ and i is a positive integer; the $1^{st}$ capacitive sensing node in each row of capacitive sensing nodes in the first target area is zeroed to obtain a second restoration value of the $1^{st}$ capacitive sensing node in each row; the second restoration values of the capacitive sensing nodes corresponding to the touch area are extracted from the first target area, and preset error correction processing is performed on the second restoration values of the capacitive sensing nodes corresponding to the touch area to obtain the target values of the capacitive sensing nodes corresponding to the touch area, where the preset error correction processing includes zeroing the second restoration values of the capacitive sensing nodes that are less than 0.

For example, under a condition that the sampled values of some capacitive sensing nodes in the touch area are greater than the preset reference value, and the sampled values of the other capacitive sensing nodes in the touch area are less than or equal to the preset reference value, it indicates that the touch area includes some positive-pole sampled values and the other negative-pole sampled values, such as the touch area 301 shown in FIG. 3.

Optionally, the target value of each capacitive sensing node in the touch area can be obtained by obtaining the target value of each capacitive sensing node in the first target area. Taking the extension by one layer as an example, as shown in FIG. 4, after the touch area 301 is extended, a first target area 401 can be obtained. The first restoration value of each capacitive sensing node, such as the values in the first target area 402 shown in FIG. 4, is obtained from the difference between each sampled value in the first target area and the preset reference value.

The capacitive sensing nodes in the second row of the first target area 402 shown in FIG. 4 are taken as an example.

Under a condition that i=3, among the second row of capacitive sensing nodes, the first restoration value of the $1^{st}$ capacitive sensing node is 2, and the first restoration value of the $2^{nd}$ capacitive sensing node is 7. The first restoration values corresponding to the capacitive sensing nodes that are from the $1^{st}$ capacitive sensing node to the $2^{nd}$ capacitive sensing node are added together to obtain a second restoration value 9 of the $3^{rd}$ capacitive sensing node, such as the values in the first target area 403 shown in FIG. 4.

Under a condition that i=4, among the second row of capacitive sensing nodes, the first restoration value of the $1^{st}$ capacitive sensing node is 2, the first restoration value of the $2^{nd}$ capacitive sensing node is 7, and the first restoration value of the $3^{rd}$ capacitive sensing node is 54. The first restoration values corresponding to the capacitive sensing nodes that are from the $1^{st}$ capacitive sensing node to the $3^{rd}$ capacitive sensing node are added together to obtain a second restoration value 63 of the 4th capacitive sensing node, such as the values in the first target area 403 shown in FIG. 4.

The calculation process for the second restoration value of each capacitive sensing node will not be listed one by one here. The $1^{st}$ capacitive sensing node in each row of capacitive sensing nodes can be zeroed to obtain a second restoration value of the $1^{st}$ capacitive sensing node in each row, such as the values in the first target area 403 shown in FIG. 4.

Optionally, since there is no capacitive sensing node before the first sensing node in each row in the first target area, in the embodiments of the present application, the first capacitive sensing node in each row of capacitive sensing nodes can be directly zeroed, such as the first target area 403 shown in FIG. 4.

Next, preset error correction processing is performed on the second restoration values of the capacitive sensing nodes corresponding to the touch area to obtain the target values of the capacitive sensing nodes corresponding to the touch area, where the preset error correction processing includes zeroing the first restoration values of the capacitive sensing nodes that are less than 0. Preset error correction processing is performed on the first target area 403 to obtain the values in the first target area 404.

According to the embodiments of the present application, each row of capacitive sensing nodes in the first target area is restored in combination with the position of the touch area by using a restoration processing mode corresponding to the touch area, to accurately determine the variation of each capacitive sensing node, namely, the target value of the capacitive sensing node.

In some embodiments, among the N columns of capacitive sensing nodes, the first column of capacitive sensing nodes is adjacent to the first preset edge of the touch screen, where the first preset edge is a first preset boundary of the capacitive sensing nodes. For example, the touch screen totally corresponds to M+1 columns of capacitive sensing nodes, where the first column of capacitive sensing nodes in the touch area is located in the first column of the M+1 columns of capacitive sensing nodes, and corresponds to the first preset edge of the touch screen, namely, the left edge.

In one example, determining the target values of the capacitive sensing nodes in each touch area may further refer to the following steps: under a condition that the sampled values of the sensing nodes in the touch area are less than or equal to the preset reference value, and the first preset edge of the touch area is adjacent to the first preset edge of the touch screen, calculating the difference between each sampled value in the first target area and the preset reference value to obtain a third restoration value of each capacitive sensing node; adding together the third restoration values corresponding to the capacitive sensing nodes that are from the $N^{th}$ capacitive sensing node to the $j^{th}$ capacitive sensing node in each row in the first target area, to obtain a fourth restoration value of the $j^{th}$ capacitive sensing node in each row in the first target area, where $1 \leq j \leq N$ and j is a positive integer; extracting the fourth restoration values of the capacitive sensing nodes corresponding to the touch area from the first target area, and taking absolute values of the fourth restoration values of the capacitive sensing nodes corresponding to the touch area to obtain the target values of the capacitive sensing nodes corresponding to the touch area.

For example, under a condition that the sampled values of the sensing nodes in the touch area are less than or equal to the preset reference value, and the first preset edge of the touch area is adjacent to the first preset edge of the touch screen, it indicates that the touch area includes negative-pole sampled values, and the position of the touch area is at the first preset edge of the touch screen.

For example, as shown in FIG. 5, after the touch area 302 is extended, the first target area 501 shown in FIG. 5 can be obtained. The third restoration value of each capacitive sensing node, such as the values in the first target area 502 shown in FIG. 5, is obtained from the difference between each sampled value in the first target area and the preset reference value.

Next, in the first target area 502 shown in FIG. 5, there are a total of 3 columns, namely, N=3.

Under a condition that j=3, among the second row of capacitive sensing nodes, the third restoration value corresponding to the $3^{rd}$ capacitive sensing node is −5. In this case, the third restoration value −5 corresponding to the $3^{rd}$ capacitive sensing node is directly designated as the third restoration value −5 corresponding to the capacitive sensing node, such as the first target area 503 in FIG. 5.

Under a condition that j=2, the third restoration value corresponding to the $3^{rd}$ capacitive sensing node is −5, the third restoration value corresponding to the $2^{nd}$ capacitive sensing node is −9, the third restoration value −5 corresponding to the $3^{rd}$ capacitive sensing node to the third restoration value −9 corresponding to the $2^{nd}$ capacitive sensing node are added together to obtain the fourth restoration value −14 of the $2^{nd}$ capacitive sensing node, such as the first target area 503 shown in FIG. 5.

Under a condition that j=1, the third restoration value corresponding to the $3^{rd}$ capacitive sensing node is −5, the third restoration value corresponding to the $2^{nd}$ capacitive sensing node is −9, the third restoration value corresponding to the $1^{st}$ capacitive sensing node is −58, the third restoration value −5 corresponding to the $3^{rd}$ capacitive sensing node to the third restoration value −58 corresponding to the $1^{st}$ capacitive sensing node are added together to obtain the fourth restoration value −72 of the $1^{st}$ capacitive sensing node, such as the values in the first target area 503 shown in FIG. 5.

Next, the fourth restoration values of the capacitive sensing nodes corresponding to the touch area are extracted from the first target area 503, and the absolute values of the fourth restoration values of the capacitive sensing nodes corresponding to the touch area are taken to obtain the target values of the capacitive sensing nodes corresponding to the touch area, such as the values in the first target area 504 shown in FIG. 5.

According to the embodiments of the present application, the corresponding target values of all the previous capacitive sensing nodes can be deduced by extension from the right edge of the first target area to the left till the boundary of the first target area and by reverse restoration.

In some embodiments, among the N columns of capacitive sensing nodes, the $N^{th}$ column of capacitive sensing nodes is adjacent to the second preset edge of the touch screen, where the second preset edge is a second preset boundary of the capacitive sensing nodes.

For example, the touch screen totally corresponds to M+1 columns of capacitive sensing nodes, where the $N^{th}$ column of capacitive sensing nodes in the touch area is located in the $M^{th}$ column of the M+1 columns of capacitive sensing nodes and corresponds to the second preset edge of the touch screen, namely, the right edge.

In one example, determining the target values of the capacitive sensing nodes in each touch area may further refer to the following steps: specifically, under a condition that the sampled values of the sensing nodes in the touch area are greater than the preset reference value, calculating the difference between each sampled value in the first target area and the preset reference value to obtain a fifth restoration value of each capacitive sensing node; extending the first target area towards the second preset edge by m columns of capacitive sensing nodes to obtain a second target area, where the fifth restoration values of the extended m columns of capacitive sensing nodes are 0; adding together the fifth restoration values corresponding to the capacitive sensing nodes that are from the $1^{st}$ capacitive sensing node to the $(i-1)^{th}$ capacitive sensing node in each row in the second target area to obtain a sixth restoration value of the $i^{th}$ capacitive sensing node in each row in the second target area, where $2 \leq i \leq N+m$ and i is a positive integer; zeroing the $1^{st}$ capacitive sensing node in each row of capacitive sensing nodes in the first target area to obtain a sixth restoration value of the $1^{st}$ capacitive sensing node in each row; extracting the sixth restoration values of the capacitive sensing nodes corresponding to the touch area from the second target area, and performing preset error correction processing on the sixth restoration values of the capacitive sensing nodes corresponding to the touch area to obtain the target values of the capacitive sensing nodes corresponding to the touch area, where the preset error correction processing includes zeroing the sixth restoration values of the capacitive sensing nodes that are less than 0.

For example, under a condition that the sampled values of the sensing nodes in the touch area are greater than the preset reference value, it indicates that the touch area includes positive-pole sampled values. Among the N columns of capacitive sensing nodes, the $N^{th}$ column of capacitive sensing nodes is adjacent to the second preset edge of the touch screen. As shown in FIG. 6, after the touch area 303 is extended, the first target area 601 as shown in FIG. 6 can be obtained. The difference between each sampled value in the first target area 601 and the preset reference value is obtained to obtain the fifth restoration value of each capacitive sensing node.

Because the $N^{th}$ column of capacitive sensing nodes in the touch area is located in the $M^{th}$ column of the M+1 columns of capacitive sensing nodes, the touch area 601 can be extended to the right by 1 column. The extended column is represented by the dashed box shown in FIG. 6. That is, in the embodiments of the present application, the first target area 601 can further be extended towards the second preset edge by 1 column of capacitive sensing nodes to obtain the second target area 602, where the fifth restoration values of the extended m columns of capacitive sensing nodes are 0. Under a condition that m=1, there are N+1 columns in the second target area.

After the second target area is obtained, restoration processing will be introduced in conjunction with the second target area 602 shown in FIG. 6.

Under a condition that i=2, among the second row of capacitive sensing nodes, the fifth restoration value of the $1^{st}$ capacitive sensing node is −2. In this case, the fifth restoration value of the $1^{st}$ capacitive sensing node can be directly used as the sixth restoration value −2 of the $2^{nd}$ capacitive sensing node, such as the values in the second target area 603 shown in FIG. 6.

Under a condition that i=3, among the second row of capacitive sensing nodes, the fifth restoration value of the $1^{st}$ capacitive sensing node is −2, and the fifth restoration value of the $2^{nd}$ capacitive sensing node is 7. The fifth restoration values corresponding to the capacitive sensing nodes that are from the $1^{st}$ capacitive sensing node to the $2^{nd}$ capacitive sensing node are added together to obtain the restoration value 5 of the $3^{rd}$ capacitive sensing node, such as the values in the second target area 603 shown in FIG. 6.

Under a condition that i=4, among the second row of capacitive sensing nodes, the fifth restoration value of the $1^{st}$ capacitive sensing node is −2, the fifth restoration value of the $2^{nd}$ capacitive sensing node is 7, and the fifth restoration value of the $3^{rd}$ capacitive sensing node is 54. The fifth restoration values corresponding to the capacitive sensing nodes that are from the $1^{st}$ capacitive sensing node to the $3^{rd}$ capacitive sensing node are added together to obtain the restoration value 59 of the 4th capacitive sensing node, such as the values in the second target area 603 shown in FIG. 6.

According to the embodiments of the present application, each row of capacitive sensing nodes in the first target area is restored in combination with the position of the touch area by using a restoration processing mode corresponding to the touch area, especially under a condition that the touch area is adjacent to the right edge of the touch screen, the touch area is first extended to the right and then subjected to restoration calculation, which can not only accurately calculate the target value of each capacitive sensing node in the original touch area, but also obtain the target values of the last column of channel by restoration under a condition that the sampled values in the last column of channel are filtered out.

Based on the same inventive concept, the present application further provides a touch detection apparatus 700 corresponding to the aforementioned touch detection method. A detailed explanation is provided in conjunction with FIG. 7.

Figure 7:
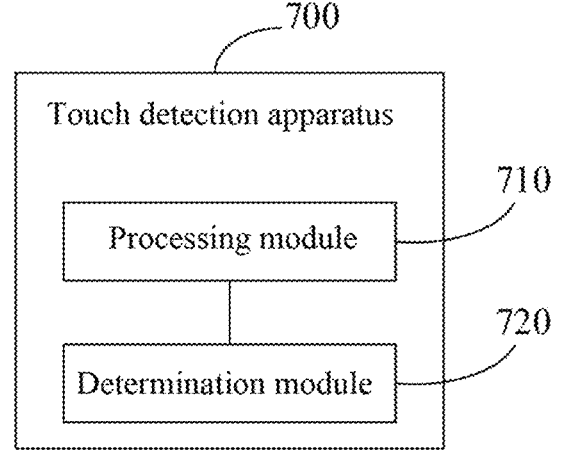
FIG. 7 is a schematic structural view of a touch detection apparatus provided in an embodiment of the present application.

FIG. 7 is a schematic structural view of a touch detection apparatus provided in an embodiment of the present application. As shown in FIG. 7, the touch detection apparatus 700 may include: a processing module 710, where the processing module 710 is configured to determine at least one touch area according to sampled values of capacitive sensing nodes of a touch screen; and a determination module 720, configured to perform, according to the sampled values of each touch area and position information of each touch area, target restoration processing on the sampled values in the touch area to determine target values of the capacitive sensing nodes in each touch area;

where the determination module 720 is further configured to determine a peak point of the target values in each touch area according to the target values of the capacitive sensing nodes in each touch area;

where the determination module 720 is further configured to determine a valid touch area according to a preset touch threshold and the peak point of the target values in each touch area.

In some embodiments, the determination module 720 is further configured to determine the type of the touch area as a valid touch area under a condition that the touch area includes a plurality of capacitive sensing nodes, and the peak point of the target values in the touch area and the target value of at least one capacitive sensing node adjacent to the peak point are both greater than the preset touch threshold.

In some embodiments, the processing module 710 is further configured to designate the touch area as a to-be-matched area under a condition that the touch area includes one capacitive sensing node and the target value of the capacitive sensing node is greater than the preset touch threshold;

The determination module 720 is further configured to perform touch trajectory matching on the to-be-matched area according to a preset touch trajectory matching algorithm, and determine the touch area as a valid touch area if the to-be-matched area succeeds in the matching.

In some embodiments, the processing module 710 is further configured to extend an edge of each touch area toward a surrounding area by a preset number of layers of capacitive sensing nodes to obtain a first target area corresponding to each touch area;

The processing module 710 is further configured to perform, according to the sampled values of each touch area and the position information of each touch area, target restoration processing on the sampled values in the first target area to obtain a target value of each capacitive sensing node in the first target area, where the first target area includes the touch area, the first target area includes N columns of capacitive sensing nodes, and N is a positive integer.

In some embodiments, the processing module 710 is further configured to obtain a difference between each sampled value in the first target area and a preset reference value under a condition that the sampled values of some capacitive sensing nodes in the touch area are greater than the preset reference value and the sampled values of the other capacitive sensing nodes in the touch area are less than or equal to the preset reference value, to obtain a first restoration value of each capacitive sensing node;

The processing module 710 is further configured to add together the first restoration values corresponding to the capacitive sensing nodes that are from the $1^{st}$ capacitive sensing node to the $(i-1)^{th}$ capacitive sensing node in each row in the first target area to obtain a second restoration value of the $i^{th}$ capacitive sensing node in each row in the first target area, where $2 \leq i \leq N$ and i is a positive integer;

The processing module 710 is further configured to zero the $1^{st}$ capacitive sensing node in each row of capacitive sensing nodes in the first target area to obtain a second restoration value of the $1^{st}$ capacitive sensing node in each row;

The processing module 710 is further configured to extract the second restoration values of the capacitive sensing nodes corresponding to the touch area from the first target area, and perform preset error correction processing on the second restoration values of the capacitive sensing nodes corresponding to the touch area to obtain the target values of the capacitive sensing nodes corresponding to the touch area;

The preset error correction processing includes zeroing the second restoration values of the capacitive sensing nodes that are less than 0.

In some embodiments, among the N columns of capacitive sensing nodes, the first column of capacitive sensing nodes is adjacent to a first preset edge of the touch screen;

The processing module 710 is further configured to calculate the difference between each sampled value in the first target area and the preset reference value under a condition that the sampled values of the sensing nodes in the touch area are all less than or equal to the preset reference value and a first preset edge of the touch area is adjacent to the first preset edge of the touch screen, to obtain a third restoration value of each capacitive sensing node;

The processing module 710 is further configured to add together the third restoration values corresponding to the capacitive sensing nodes that are from the $N^{th}$ capacitive sensing node to the $j^{th}$ capacitive sensing node in each row in the first target area, to obtain a fourth restoration value of the $j^{th}$ capacitive sensing node in each row in the first target area, where $1 \leq j \leq N$ and j is a positive integer;

The processing module 710 is further configured to extract the fourth restoration values of the capacitive sensing nodes corresponding to the touch area from the first target area, and take absolute values of the fourth restoration values of the capacitive sensing nodes corresponding to the touch area to obtain the target values of the capacitive sensing nodes corresponding to the touch area.

In some embodiments, among the N columns of capacitive sensing nodes, the $N^{th}$ column of capacitive sensing nodes is adjacent to a second preset edge of the touch screen;

The processing module 710 is further configured to calculate the difference between each sampled value in the first target area and the preset reference value under a condition that the sampled value of each capacitive sensing node in the touch area is greater than the preset reference value, to obtain a fifth restoration value of each capacitive sensing node;

The processing module 710 is further configured to extend the first target area towards the second preset edge by m columns of capacitive sensing nodes to obtain a second target area, where the fifth restoration values of the extended m columns of capacitive sensing nodes are 0;

The processing module 710 is further configured to add together the fifth restoration values corresponding to the capacitive sensing nodes that are from the $1^{st}$ capacitive sensing node to the $(i-1)^{th}$ capacitive sensing node in each row in the second target area to obtain a sixth restoration value of the $i^{th}$ capacitive sensing node in each row in the second target area, where $2 \leq i \leq N+m$ and i is a positive integer;

The processing module 710 is further configured to zero the $1^{st}$ capacitive sensing node in each row of capacitive sensing nodes in the first target area to obtain a sixth restoration value of the $1^{st}$ capacitive sensing node in each row;

The processing module 710 is further configured to extract the sixth restoration values of the capacitive sensing nodes corresponding to the touch area from the second target area, and perform preset error correction processing on the sixth restoration values of the capacitive sensing nodes corresponding to the touch area to obtain the target values of the capacitive sensing nodes corresponding to the touch area;

The preset error correction processing includes zeroing the sixth restoration values of the capacitive sensing nodes that are less than 0.

It can be understood that the touch detection apparatus 700 in the embodiments of the present application can correspond to an executive subject of the touch detection method provided in the embodiments of the present application. Specific details of the operation and/or function of each module/unit of the touch detection apparatus 700 can refer to the description of the corresponding part of the touch detection method in the embodiments of the present application. For the sake of simplicity, the details will not be repeated here.

According to the embodiments of the present application, corresponding sampled value target restoration processing is determined by the sampled values of each touch area and the position information of each touch area, and different restoration processing can be performed on different touch areas to reduce the loss of sampled values and avoid missing sampled values and detection omissions, thereby improving the accuracy of determining valid touch areas. Afterwards, the peak point of the target values in each touch area can be determined according to the target values of the capacitive sensing nodes in each touch area; and the valid touch area can be determined according to the preset touch threshold and the peak point of the target values in each touch area, thereby improving the accuracy of determining the type of each touch area.

Figure 8:
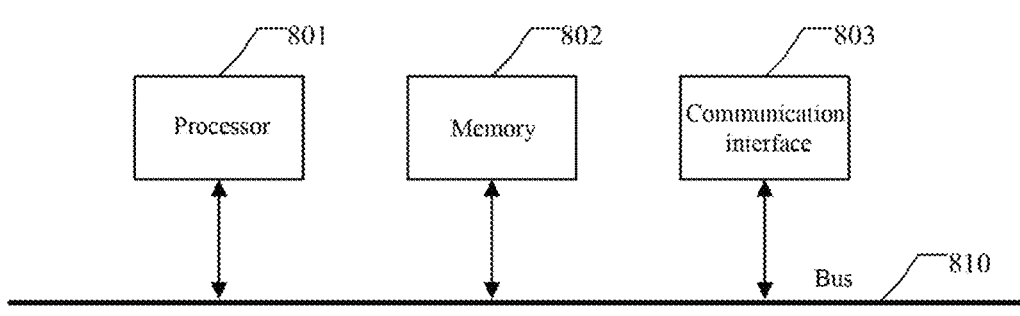
FIG. 8 is a schematic structural view of an electronic device provided in an embodiment of the present application.

FIG. 8 illustrates a schematic structural view of an electronic device provided in an embodiment of the present application. As shown in FIG. 8, the device may include a processor 801 and a memory 802 storing computer program instructions.

Specifically, the processor 801 may include a central processing unit (CPU) or an application specific integrated circuit (ASIC), or may be configured to implement one or more integrated circuits in the embodiments of the present application.

The memory 802 may include mass memories for information or instructions. By way of example and not limitation, the memory 802 may be a hard disk drive (HDD), a floppy disk drive, a flash memory, an optical disk, a magneto-optical disk, a magnetic tape, or a universal serial bus (USB) drive, or a combination of two or more of these. In one example, the memory 802 may include removable or non-removable (or fixed) media, or the memory 802 may be a non-volatile solid-state memory. The memory 802 may be inside or outside the electronic device.

The memory may include read-only memories (ROM), random access memories (RAM), magnetic disk storage medium devices, optical storage medium devices, flash memory devices, and electrical, optical, or other physical/tangible memory storage devices. Therefore, typically, the memory includes one or more tangible (non-transient) computer-readable storage media (such as memory devices) encoded with software including computer executable instructions, and under a condition that the software is executed (for example, by one or more processors), it can perform the operation described with reference to the method according to one aspect of the present disclosure.

The processor 801 reads and executes the computer program instructions stored in the memory 802 to implement the method described in the embodiments of the present application and achieve the corresponding technical effects achieved by the execution of the method in the embodiments of the present application. For the sake of simplicity, details will not be repeated here.

In one example, the electronic device may further include a communication interface 803 and a bus 810. As shown in FIG. 8, the processor 801, the memory 802, and the communication interface 803 are connected and communicate with each other through the bus 810.

The communication interface 803 is mainly configured to implement communication between various modules, apparatuses, units, and/or devices in the embodiments of the present application.

The bus 810 includes hardware, software, or both, coupling components of on-line information traffic billing devices together. By way of example and not limitation, the bus may be an accelerated graphics port (AGP) or other graphics bus, an extended industry standard architecture (EISA) bus, a front side bus (FSB), a hyper transport (HT) interconnect, an industry standard architecture (ISA) bus, an infinite bandwidth interconnect, a low pin count (LPC) bus, a memory bus, a microchannel architecture (MCA) bus, a peripheral component interconnect (PCI) bus, a PCI-Express (PCI-X) bus, a serial advanced technology attachment (SATA) bus, a video electronics standards association local (VLB) bus, or any other suitable bus, or a combination of two or more of the above. Where appropriate, the bus 810 may include one or more buses. Although the embodiment of the present application describes and shows a specific bus, the present application considers any suitable bus or interconnect.

The electronic device can execute the touch detection method in the embodiments of the present application, thereby achieving the corresponding technical effects of the touch detection method described in the embodiments of the present application.

Moreover, in conjunction with the touch detection method in the aforementioned embodiments, an embodiment of the present application may provide a readable storage medium for implementation. The readable storage medium stores computer program instructions; and under a condition that the computer program instructions are executed by a processor, any touch detection method in the aforementioned embodiments is implemented. Examples of the readable storage medium may be non-transient machine-readable media, such as electronic circuits, semiconductor memory devices, read-only memories (ROM), floppy disks, compact disc read-only memories (CD-ROM), CDs, and hard disks.

It should be clear that the present application is not limited to the specific configuration and processing described above and shown in the drawings. For the sake of simplicity, detailed descriptions of known methods are omitted here. In the aforementioned embodiments, several specific steps are described and shown as examples. However, the method process of the present application is not limited to the specific steps described and shown. After understanding the spirit of the present application, a person skilled in the art can make various changes, modifications and additions, or change the order between the steps.

The functional blocks shown in the above structural block view can be implemented as hardware, software, firmware, or a combination thereof. Under a condition that implemented in hardware, the functional blocks may be, for example, electronic circuits, application specific integrated circuits (ASIC), appropriate firmware, plug-ins, or function cards. Under a condition that implemented in software, the elements of the present application are programs or code segments used to perform required tasks. The programs or code segments may be stored in a machine-readable medium, or transmitted over a transmission medium or communication link through data signals carried in carrier waves. The "machine-readable medium" may include any medium that can store or transmit information. Examples of the machine-readable medium include electronic circuits, semiconductor memory devices, read-only memories (ROM), flash memories, erasable read-only memories (EROM), floppy disks, compact disc read-only memories (CD-ROM), optical disks, hard disks, fiber optic media, radio frequency (RF) links, etc. The code segments may be downloaded via a computer network such as the Internet and Intranet.

It should also be noted that the exemplary embodiments mentioned in the present application describe some methods or systems based on a series of steps or devices. However, the present application is not limited to the order of the above steps, that is, the steps may be performed in the order mentioned in the embodiments or in an order different from that in the embodiments, or several steps may be performed simultaneously.

An embodiment of the present application further provides a computer-readable storage medium, storing computer program instructions; under a condition that the computer program instructions are executed by a processor, the touch detection method provided in the embodiments of the present application is implemented.

In addition, by combining the touch detection method and apparatus and the readable storage medium in the above embodiments, an embodiment of the present application may provide a computer program product for implementation. Under a condition that the instructions in the computer program product are executed by a processor of an electronic device, the electronic device is enabled to perform any touch detection method in the above embodiments.

The above describes various aspects of the present application with reference to the flowcharts and/or block views of the method, apparatus (system), and computer program product according to the embodiments of the present application. It should be understood that each box in the flowchart and/or block view and a combination of boxes in the flowchart and/or block view can be implemented by computer program instructions. These computer program instructions can be provided to a processor of a general-purpose computer, a dedicated computer, or other programmable data processing apparatuses to produce a machine, which enables the instructions executed by the processor of the computer or other programmable data processing apparatuses to implement the functions/actions specified in one or more boxes of the flowchart and/or block view. Such a processor may be, but is not limited to a general-purpose processor, a dedicated processor, a special application processor, or a field programmable logic circuit. It can also be understood that each box in the block view and/or flowchart and a combination of boxes in the block view and/or flowchart can be implemented by dedicated hardware that executes specified functions or actions, or by a combination of dedicated hardware and computer instructions.

Described above are merely specific implementations of the present application. A person skilled in the art can clearly understand that, for the sake of convenience and briefness in description, the specific working processes of the above-described systems, modules and units may refer to the corresponding processes in the embodiments of the afore-mentioned methods, and details are not described herein again. It should be understood that the protection scope of the present application is not limited thereto. A person skilled in the art can readily conceive various equivalent modifications or replacements within the technical scope disclosed by the present application, and these modifications or replacements shall fall within the protection scope of the present application.

What is claimed is:

1. A touch detection method, comprising:

determining at least one touch area according to sampled values of capacitive sensing nodes of a touch screen;

performing, according to the sampled values of each of the at least one touch area and position information of each of the at least one touch area, target restoration processing on the sampled values in each of the at least one touch area to determine target values of the capaci-tive sensing nodes in each of the at least one touch area;

determining a peak point of the target values in each of the at least one touch area according to the target values of the capacitive sensing nodes in each of the at least one touch area; and determining a valid touch area according to a preset touch threshold and the peak point of the target values in each of the at least one touch area, wherein before the performing, according to the sampled values of each of the least one touch area and position informa-tion of each of the least one touch area, target restora-tion processing on the sampled values in each of the at least one touch area to determine target values of the capacitive sensing nodes in each of the least one touch area, the method further comprises:

extending an edge of each of the at least one touch area toward a surrounding area by a preset number of layers of capacitive sensing nodes to obtain a first target area corresponding to each of the at least one touch area; and performing, according to the sampled values of each of the at least one touch area and the position information of each of the at least one touch area, target restoration processing on the sampled values in the first target area to obtain a target value of each capacitive sensing node in the first target area, wherein the first target area comprises the touch area, and the first target area comprises N columns of capacitive sensing nodes, and N is a positive integer.

2. The method according to claim 1, wherein the deter-mining a valid touch area according to a preset touch threshold and the peak point of the target values in each of the at least one touch area comprises:

determining the touch area of such a type as a valid touch area under a condition that the touch area comprises a plurality of capacitive sensing nodes, and the peak point of the target values in the touch area and the target value of at least one capacitive sensing node adjacent to the peak point are both greater than the preset touch threshold.

3. The method according to claim 1, wherein the deter-mining a valid touch area according to a preset touch threshold and the peak point of the target values in each of the at least one touch area comprises:

designating the touch area as a to-be-matched area under a condition that the touch area comprises one capacitive sensing node and the target value of the capacitive sensing node is greater than the preset touch threshold; and performing touch trajectory matching on the to-be-matched area according to a preset touch trajectory matching algorithm, and determining the touch area as a valid touch area if the matching succeeds for the to-be-matched area.

4. The method according to claim 1, wherein the perform-ing, according to the sampled values of each of the at least one touch area and position information of each of the at least one touch area, target restoration processing on the sampled values in the touch area to determine target values of the capacitive sensing nodes in each of the at least one touch area comprises:

obtaining a difference between each of the sampled values in the first target area and a preset reference value under a condition that the sampled values of some of the capacitive sensing nodes in the touch area are greater than the preset reference value and the sampled values of the other capacitive sensing nodes in the touch area are less than or equal to the preset reference value, to obtain a first restoration value of each capacitive sens-ing node;

adding together the first restoration values corresponding to the capacitive sensing nodes that are from the $1^{st}$ capacitive sensing node to the $(i-1)^{th}$ capacitive sensing node in each row in the first target area to obtain a second restoration value of the $i^{th}$ capacitive sensing node in each row in the first target area, wherein $2 \leq i \leq N$ and i is a positive integer;

zeroing the $1^{st}$ capacitive sensing node in each row of capacitive sensing nodes in the first target area to obtain a second restoration value of the $1^{st}$ capacitive sensing node in each row; and extracting, from the first target area, the second restora-tion values of the capacitive sensing nodes correspond-ing to the touch area, and performing preset error correction processing on the second restoration values of the capacitive sensing nodes corresponding to the touch area to obtain the target values of the capacitive sensing nodes corresponding to the touch area, wherein the preset error correction processing comprises zeroing the second restoration values of the capacitive sensing nodes that are less than 0.

5. The method according to claim 1, wherein among the N columns of capacitive sensing nodes, the first column of capacitive sensing nodes is adjacent to a first preset edge of the touch screen; and the performing, according to the sampled values of each of the at least one touch area and position information of each of the at least one touch area, target restoration processing on the sampled values in each of the at least one touch area to determine target values of the capaci-tive sensing nodes in each of the at least one touch area comprises:

calculating a difference between each of the sampled values in the first target area and the preset reference value under a condition that the sampled values of the sensing nodes in the touch area all are less than or equal to the preset reference value and a first preset edge of the touch area is adjacent to the first preset edge of the touch screen, to obtain a third restoration value of each of the capacitive sensing nodes;

adding together the third restoration values corresponding to the capacitive sensing node that are from the $N^{th}$ capacitive sensing node to the $j^{th}$ capacitive sensing node in each row in the first target area, to obtain a fourth restoration value of the $j^{th}$ capacitive sensing node in each row in the first target area, wherein $1 \leq j \leq N$ and j is a positive integer; and extracting, from the first target area, the fourth restoration values of the capacitive sensing nodes corresponding to the touch area, and taking absolute values of the fourth restoration values of the capacitive sensing nodes corresponding to the touch area to obtain the target values of the capacitive sensing nodes corresponding to the touch area.

6. The method according to claim 1, wherein among the N columns of capacitive sensing nodes, the $N^{th}$ column of capacitive sensing nodes is adjacent to a second preset edge of the touch screen; and the performing, according to the sampled values of each of the at least one touch area and position information of each of the at least one touch area, target restoration processing on the sampled values in each of the at least one touch area to determine target values of the capacitive sensing nodes in each of the at least one touch area comprises:

calculating a difference between each of the sampled values in the first target area and the preset reference value under a condition that the sampled value of each of the capacitive sensing nodes in the touch area is greater than the preset reference value, to obtain a fifth restoration value of each of the capacitive sensing nodes;

extending the first target area towards the second preset edge by m columns of capacitive sensing nodes to obtain a second target area, wherein the fifth restoration values of the extended m columns of capacitive sensing nodes are 0;

adding together the fifth restoration values corresponding to the capacitive sensing nodes that are from the $1^{st}$ capacitive sensing node to the $(i-1)^{th}$ capacitive sensing node in each row in the second target area to obtain a sixth restoration value of the $i^{th}$ capacitive sensing node in each row in the second target area, wherein $2 \leq i \leq N+m$ and i is a positive integer;

zeroing the $1^{st}$ capacitive sensing node in each row of capacitive sensing nodes in the first target area to obtain a sixth restoration value of the $1^{st}$ capacitive sensing node in each row; and extracting, from the second target area, the sixth restoration values of the capacitive sensing nodes corresponding to the touch area, and performing preset error correction processing on the sixth restoration values of the capacitive sensing nodes corresponding to the touch area to obtain the target values of the capacitive sensing nodes corresponding to the touch area, wherein the preset error correction processing comprises zeroing the sixth restoration values of the capacitive sensing nodes that are less than 0.

7. A touch detection apparatus, comprising:

a processing module, configured to determine at least one touch area according to sampled values of capacitive sensing nodes of a touch screen; and a determination module, configured to perform, according to the sampled values of each of the at least one touch area and position information of each of the at least one touch area, target restoration processing on the sampled values in each of the at least one touch area to determine target values of the capacitive sensing nodes in each of the at least one touch area;

wherein the determination module is further configured to determine a peak point of the target values in each of the at least one touch area according to the target values of the capacitive sensing nodes in each of the at least one touch area;

wherein the determination module is further configured to determine a valid touch area according to a preset touch threshold and the peak point of the target values in each of the at least one touch area;

wherein the processing module is further configured to extend an edge of each of the at least one touch area toward a surrounding area by a preset number of layers of capacitive sensing nodes to obtain a first target area corresponding to each of the at least one touch area; and wherein the processing module is further configured to perform, according to the sampled values of each of the least one touch area and the position information of each of the at least one touch area, target restoration processing on the sampled values in the first target area to obtain a target value of each capacitive sensing node in the first target area, wherein the first target area comprises the touch area, and the first target area comprises N columns of capacitive sensing nodes, and N is a positive integer.

8. The apparatus according to claim 7, wherein the determination module is further configured to determine the touch area of such a type as a valid touch area under a condition that the touch area comprises a plurality of capacitive sensing nodes, and the peak point of the target values in the touch area and the target value of at least one capacitive sensing node adjacent to the peak point are both greater than the preset touch threshold.

9. The apparatus according to claim 7, wherein the processing module is further configured to designate the touch area as a to-be-matched area under a condition that the touch area comprises one capacitive sensing node and the target value of the capacitive sensing node is greater than the preset touch threshold; and the determination module is further configured to perform touch trajectory matching on the to-be-matched area according to a preset touch trajectory matching algorithm, and determine the touch area as a valid touch area if the matching succeeds for the to-be-matched area.

10. The apparatus according to claim 7, wherein the processing module is further configured to obtain a difference between each of the sampled values in the first target area and a preset reference value under a condition that the sampled values of some of the capacitive sensing nodes in the touch area are greater than the preset reference value and the sampled values of the other capacitive sensing nodes in the touch area are less than or equal to the preset reference value, to obtain a first restoration value of each capacitive sensing node;

the processing module is further configured to add together the first restoration values corresponding to the capacitive sensing nodes that are from the $1^{st}$ capacitive sensing node to the $(i-1)^{th}$ capacitive sensing node in each row in the first target area to obtain a second restoration value of the $i^{th}$ capacitive sensing node in each row in the first target area, wherein $2 \le i \le N$ and i is a positive integer;

the processing module is further configured to zero the $1^{st}$ capacitive sensing node in each row of capacitive sensing nodes in the first target area to obtain a second restoration value of the $1^{st}$ capacitive sensing node in each row; and the processing module is further configured to extract, from the first target area, the second restoration values of the capacitive sensing nodes corresponding to the touch area, and perform preset error correction processing on the second restoration values of the capacitive sensing nodes corresponding to the touch area to obtain the target values of the capacitive sensing nodes corresponding to the touch area, wherein the preset error correction processing comprises zeroing the second restoration values of the capacitive sensing nodes that are less than 0.

11. The apparatus according to claim 7, wherein among the N columns of capacitive sensing nodes, the first column of capacitive sensing nodes is adjacent to a first preset edge of the touch screen; and the processing module is further configured to calculate a difference between each of the sampled values in the first target area and the preset reference value under a condition that the sampled values of the sensing nodes in the touch area all are less than or equal to the preset reference value and a first preset edge of the touch area is adjacent to the first preset edge of the touch screen, to obtain a third restoration value of each of the capacitive sensing nodes;

the processing module is further configured to add together the third restoration value corresponding to the capacitive sending node that are from the $N^{th}$ capacitive sensing node to the $j^{th}$ capacitive sensing node in each row in the first target area, to obtain a fourth restoration value of the $j^{th}$ capacitive sensing node in each row in the first target area, wherein $1 \le j \le N$ and j is a positive integer; and the processing module is further configured to extract, from the first target area, the fourth restoration values of the capacitive sensing nodes corresponding to the touch area, and take absolute values of the fourth restoration values of the capacitive sensing nodes corresponding to the touch area to obtain the target values of the capacitive sensing nodes corresponding to the touch area.

12. The apparatus according to claim 7, wherein among the N columns of capacitive sensing nodes, the $N^{th}$ column of capacitive sensing nodes is adjacent to a second preset edge of the touch screen; and the processing module is further configured to calculate a difference between each of the sampled values in the first target area and the preset reference value under a condition that the sampled value of each of the capacitive sensing nodes in the touch area is greater than the preset reference value, to obtain a fifth restoration value of each of the capacitive sensing nodes;

the processing module is further configured to extend the first target area towards the second preset edge by m columns of capacitive sensing nodes to obtain a second target area, wherein the fifth restoration values of the extended m columns of capacitive sensing nodes are 0;

the processing module is further configured to add together the fifth restoration value corresponding to the capacitive sensing nodes that are from the $1^{st}$ capacitive sensing node to the $(i-1)^{th}$ capacitive sensing node in each row in the second target area to obtain a sixth restoration value of the $i^{th}$ capacitive sensing node in each row in the second target area, wherein $2 \le i \le N+m$ and i is a positive integer;

the processing module is further configured to zero the $1^{st}$ capacitive sensing node in each row of capacitive sensing nodes in the first target area to obtain a sixth restoration value of the $1^{st}$ capacitive sensing node in each row; and the processing module is further configured to extract, from the second target area, the sixth restoration values of the capacitive sensing nodes corresponding to the touch area, and perform preset error correction processing on the sixth restoration values of the capacitive sensing nodes corresponding to the touch area to obtain the target values of the capacitive sensing nodes corresponding to the touch area;

wherein the preset error correction processing comprises zeroing the sixth restoration values of the capacitive sensing nodes that are less than 0.

13. An electronic device, comprising: a processor, and a non-transitory memory storing computer program instructions, wherein the processor reads and executes the computer program instructions to implement the touch detection method according to claim 1.

14. A non-transient readable storage medium storing computer program instructions that, when executed by a processor, implement the touch detection method according to claim 1.

15. A non-transitory computer program product, wherein instructions in the computer program product, when executed by a processor of an electronic device, enable the electronic device to perform the touch detection method according to claim 1.

* * * * *